(12) United States Patent
Kim (10) Patent No.: US 7,292,284 B2
(45) Date of Patent: Nov. 6, 2007

(54) METHOD AND APPARATUS DISPLAYING DOUBLE SCREEN

(75) Inventor: Jung-dae Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 512 days.

(21) Appl. No.: 10/860,581

(22) Filed: Jun. 4, 2004

(65) Prior Publication Data

US 2004/0263686 A1    Dec. 30, 2004

(30) Foreign Application Priority Data

Jun. 26, 2003   (KR) .......................... 10-2003-42115

(51) Int. Cl.
*H04N 5/45* (2006.01)
(52) U.S. Cl. .................. 348/564; 348/565; 348/588
(58) Field of Classification Search ........ 348/564–568, 348/569, 570, 593–601
See application file for complete search history.

(56) References Cited

U.S. PATENT DOCUMENTS 5,130,800 A * 7/1992 Johnson et al. ............. 348/564
5,146,335 A * 9/1992 Kim et al. .................. 348/564
5,680,177 A * 10/1997 Abe ............................ 348/564
6,515,643 B1   2/2003 Kamiko et al.

FOREIGN PATENT DOCUMENTS

CH           1330490        1/2002
JP           06-209438      7/1994

OTHER PUBLICATIONS

Office Action issued by the Korean Intellectual Property Office on Apr. 29, 2005 in Korean Patent Application No. 10-2003-0042115.
The First Office Action issued by The Patent Office of the People's Republic of China in Application No. 200410059809.8 that corresponds to the present U.S. application.

* cited by examiner

Primary Examiner—Michael H. Lee
(74) Attorney, Agent, or Firm—Staas & Halsey LLP (57) ABSTRACT

An apparatus for displaying a double screen in a wide screen display device, the apparatus including a video interface to receive a first and a second video signal from a plurality of video signals according to a selection control signal, wherein each of the first and the second video signals have a general screen aspect ratio; a scaler to scale the first video signal to a resolution of a main screen and to scale the second video signal to a resolution of a subscreen with the general screen aspect ratio; and a control unit to output the selection control signal to display the double screen, control scaling of the first video signal and second video signal, and to simultaneously display the scaled first video signal on an area of a screen and the scaled second video signal on a portion of a remaining area of the screen.

31 Claims, 8 Drawing Sheets

METHOD AND APPARATUS DISPLAYING DOUBLE SCREEN

CROSS-REFERENCE TO RELATED APPLICATION

This application claims the priority of Korean Patent Application No. 2003-42115, filed on Jun. 26, 2003, in the Korean Intellectual Property Office, the disclosure of which is incorporated herein by reference.

BACKGROUND OF THE INVENTION

1. Field of the Invention

The present invention relates to a display device and method, and more particularly, to an apparatus and method of displaying a double screen in a display device capable of displaying the double screen, in which a main screen is displayed at a 4:3 aspect ratio on the right or left side of the entire screen and a subscreen is displayed at the 4:3 aspect ratio on the remaining area.

2. Description of the Related Art

Currently, home televisions are being developed in such a way that they not only provide users with image information but also allow users to enjoy television watching to the fullest, such that televisions can be connected to communication networks and users can search information. Also, with the advent of wide screen televisions, images are displayed on a wide screen with a 16:9 aspect ratio instead of a screen with a 4:3 aspect ratio of normal televisions. Thus, it has become possible to provide users with high-quality broadcasting services.

Presently, most televisions include a video interface capable of connecting to various video signal inputs. When a user desires to watch a video signal aside from a video signal presently input through a video interface, that is input through another video interface, the user must connect to the other video interface and navigate through an on screen display (OSD) menu using a keyboard or remote control of a television, thus manually converting input/output paths of the video signals.

In current televisions, a double screen can be displayed as a picture-in-picture (PIP) or picture-by-picture (PBP) screen.

Figure 1A:
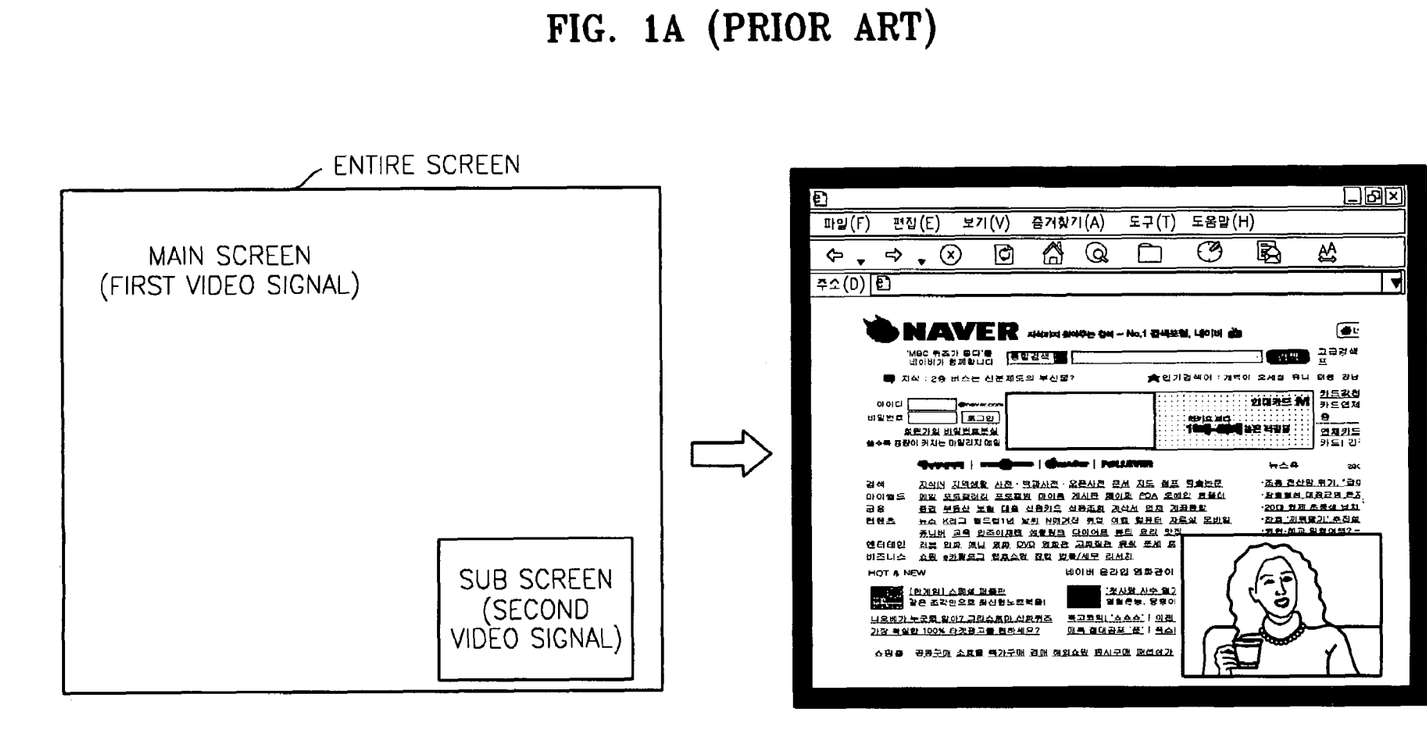
FIGS. 1A through 1C illustrate a conventional double-screen display.

FIG. 1A illustrates a conventional PIP screen. In FIG. 1A, the PIP screen includes a main screen and a subscreen displayed on a small portion of the main screen. If the double screen is displayed as the PIP screen, a first video signal of the main screen is scaled to a 16:9 aspect ratio and is then displayed on the entire screen. If the first video signal of the main screen has a 4:3 aspect ratio, it is horizontally enlarged to a 16:9 aspect ratio and is then displayed. Thus, distortion with respect to originally input screen information occurs. Also, in the PIP screen, a second video signal of the subscreen is scaled to a 16:9 aspect ratio and is then displayed on a portion of the entire screen at a specific size. If the second video signal of the subscreen has the 4:3 aspect ratio, it is horizontally enlarged to a 16:9 aspect ratio and is then displayed. Thus, distortion with respect to the originally input screen information occurs.

Figure 1B:
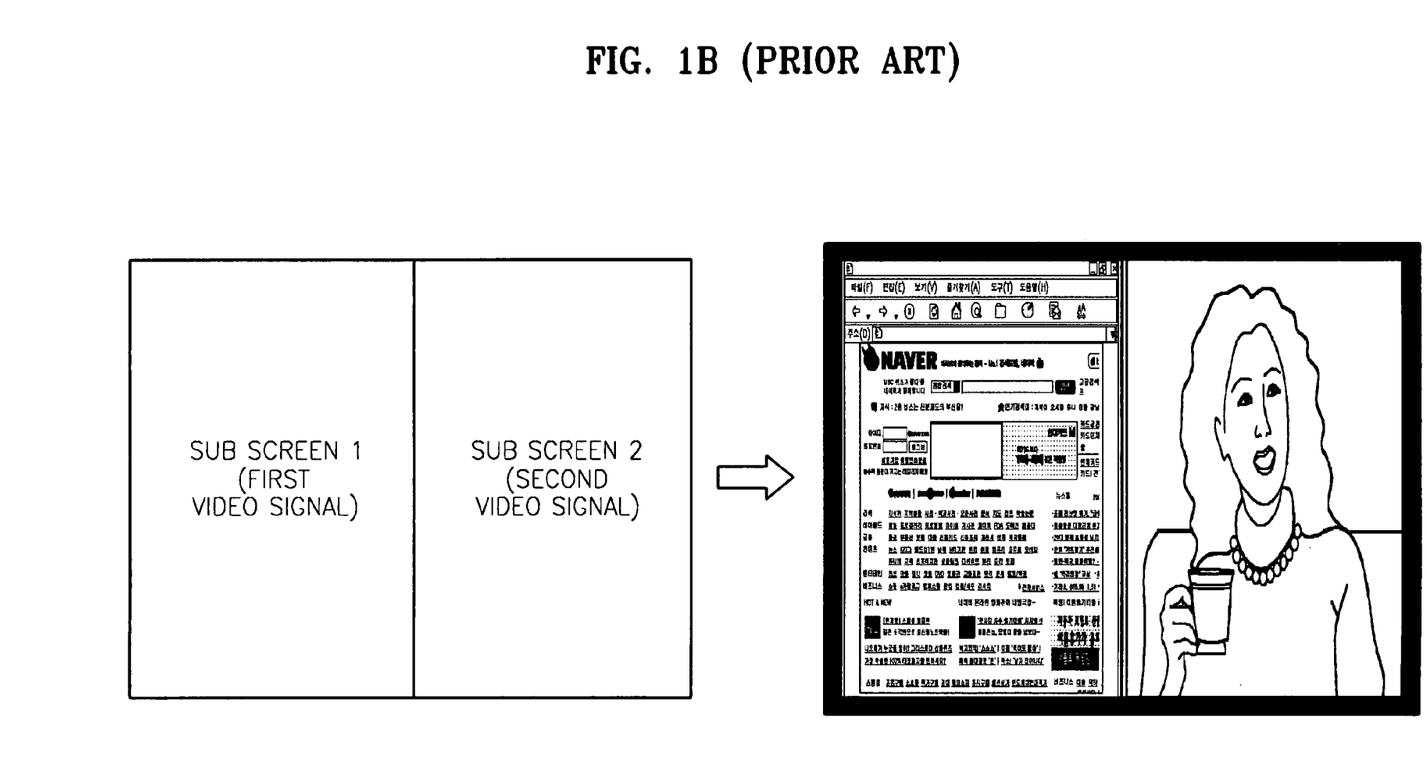

FIG. 1B illustrates a conventional PBP screen. In FIG. 1B, the entire PBP screen is divided into two parts, i.e., a subscreen 1 and a subscreen 2, wherein the two parts are respectively displayed. If the double screen is displayed as the PBP screen, the entire screen is divided into two parts. The video signals of the two parts are scaled to the same aspect ratio and are then displayed. If a first video signal of the subscreen 1 and an second video signal of the subscreen 2 have 4:3 aspect ratios, they are vertically enlarged to 16:9 aspect ratios and are then displayed. Thus, distortion with respect to original input screen information occurs.

Figure 1C:
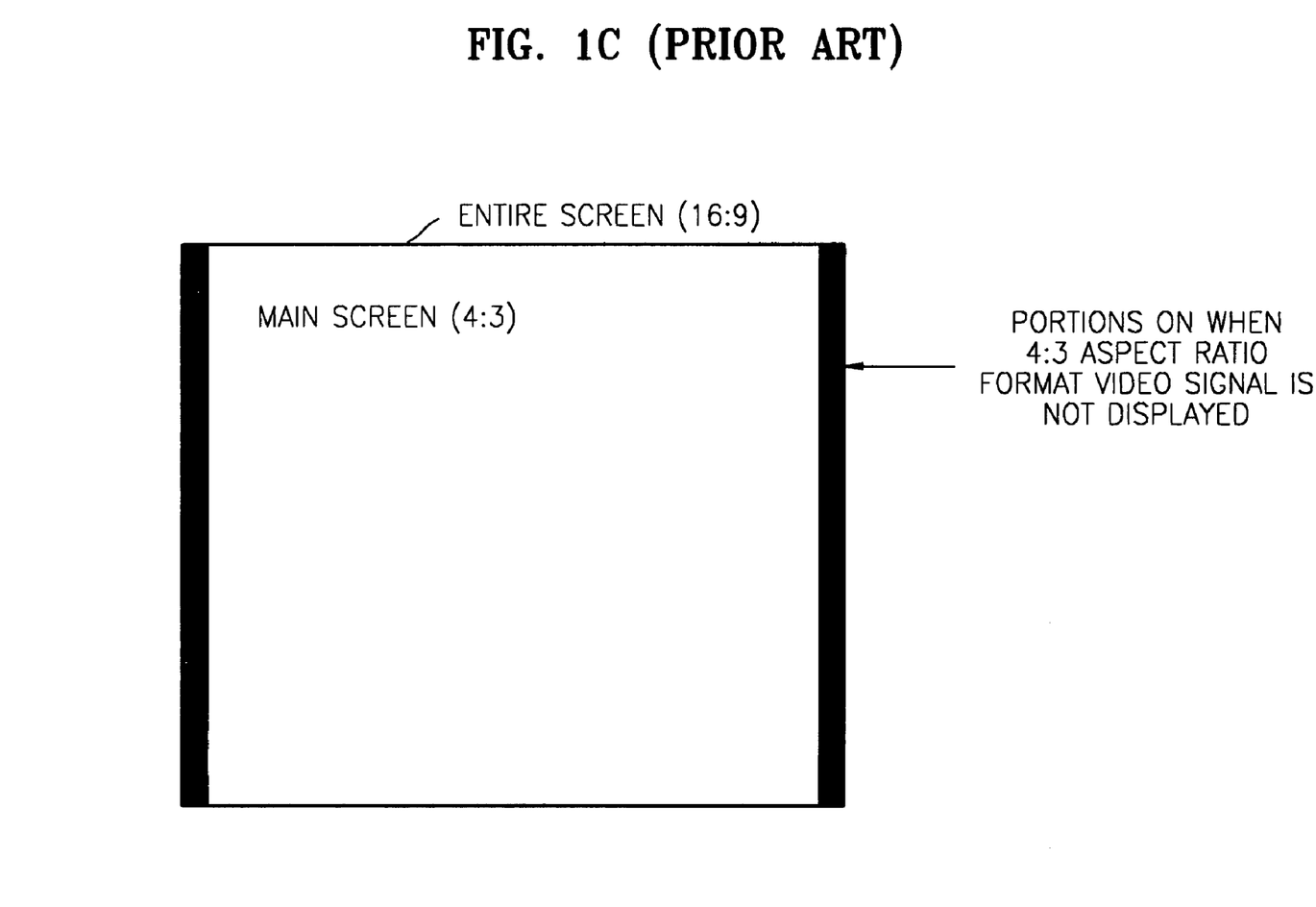

FIG. 1C illustrates a screen with the 16:9 aspect ratio on which an original video signal with the 4:3 aspect ratio is displayed. In FIG. 1C, parts on which the 4:3 aspect ratio format video signal is not displayed are processed to be black.

U.S. Pat. No. 6,515,643 discloses such double screen display.

When the double screen is displayed as the PIP screen, some parts of a main screen are covered by a subscreen. As a result, all information of the main screen cannot be displayed. Thus, if a user wishes to receive two types of video signals and simultaneously process such video signals, the user has to scroll the main screen or close the subscreen to watch the covered portion of the main screen. Moreover, if input video signals have a 4:3 aspect ratio, they are enlarged horizontally (in a case of the PIP screen) or vertically (in a case of the PBP screen) with respect to originally input screen information and are then displayed. Consequently, the user must watch a distorted screen.

SUMMARY OF THE INVENTION

The present invention provides an apparatus and method for displaying a double screen, in which a main screen is displayed at a 4:3 aspect ratio on the right or left side of a display device and a subscreen is displayed at the 4:3 aspect ratio on the remaining area, thereby preventing loss of main screen information and allowing a user to watch an undistorted screen.

According to an aspect of the present invention, there is provided an apparatus for displaying a double screen in a wide screen display device. The apparatus comprises a video interface, a scaler, and a control unit. The video interface receives a first video signal and a second video signal among various video signals input from outside the wide screen display device according to a selection control signal, the first video signal and the second video signal having general screen aspect ratios. The scaler scales the first video signal to a resolution of a main screen with the general screen aspect ratio and scales the second video signal to a resolution of a subscreen with the general screen aspect ratio, according to a scaling control signal. The control unit outputs the selection control signal for displaying the double screen, controls scaling of the first video signal and second video signal according to a main screen selection signal of the first video signal and a subscreen selection signal of the second video signal, and simultaneously displays the scaled first video signal on an area of the entire screen and the scaled second video signal on the remaining area of the entire screen.

The scaler scales the first video signal to a resolution of 1024×768, on the entire screen with a resolution of 1280×768 and scales the second video signal to a resolution of 256×192, on the entire screen with the resolution of 1280×768.

The control unit operates such that the first video signal and the second video signal are displayed at their original aspect ratios without any distortion and an input video signal is not obscured by another video signal.

The control unit converts the main screen into the subscreen and the subscreen into the main screen according to a screen conversion signal input from outside the wide screen display device.

The main screen is converted into the subscreen, the control unit outputs the scaling control signal to gradually reduce the main screen while maintaining the general screen aspect ratio of the main screen, and when the subscreen is converted into the main screen, the control unit outputs the scaling control signal to gradually enlarge the sub screen while maintaining the general screen aspect ratio of the subscreen.

A process of gradual screen conversion is displayed on the wide screen display device.

According to another aspect of the present invention, there is provided a method of displaying a double screen. The method comprises receiving a first video signal and a second video signal among various video signals input from outside the wide screen display device according to a selection control signal, the first video signal and the second video signal having general screen aspect ratios, scaling the first video signal to a resolution of a main screen with the general screen aspect ratio and scaling the second video signal to a resolution of a subscreen with the general screen aspect ratio, according to a scaling control signal, and displaying the scaled first video signal on an area of the entire screen and the scaled second video signal on the remaining area of the entire screen.

The method further comprises converting the main screen of the first video signal into the subscreen of the second video signal and the subscreen of the second video signal into the main screen of the first video signal.

The method further comprises, when the main screen is converted into the subscreen, outputting the scaling control signal to gradually reduce the main screen while maintaining the general screen aspect ratio of the main screen, and when the subscreen is converted into the main screen, outputting the scaling control signal to gradually enlarge the subscreen while maintaining the general screen aspect ratio of the subscreen.

A process of gradual screen conversion is displayed on the wide screen display device.

When the first video signal is scaled to a resolution of a main screen with the general screen aspect ratio and the second video signal is scaled to a resolution of a subscreen with the general screen aspect ratio, according to a scaling control signal, the first video signal is scaled to a resolution of 1024×768 and the second video signal is scaled to a resolution of 256×192.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

The present invention will now be described more fully with reference to the accompanying drawings, in which a preferred embodiment of the invention is shown. In the drawings, like reference numerals are used to refer to like elements throughout.

Figure 2:
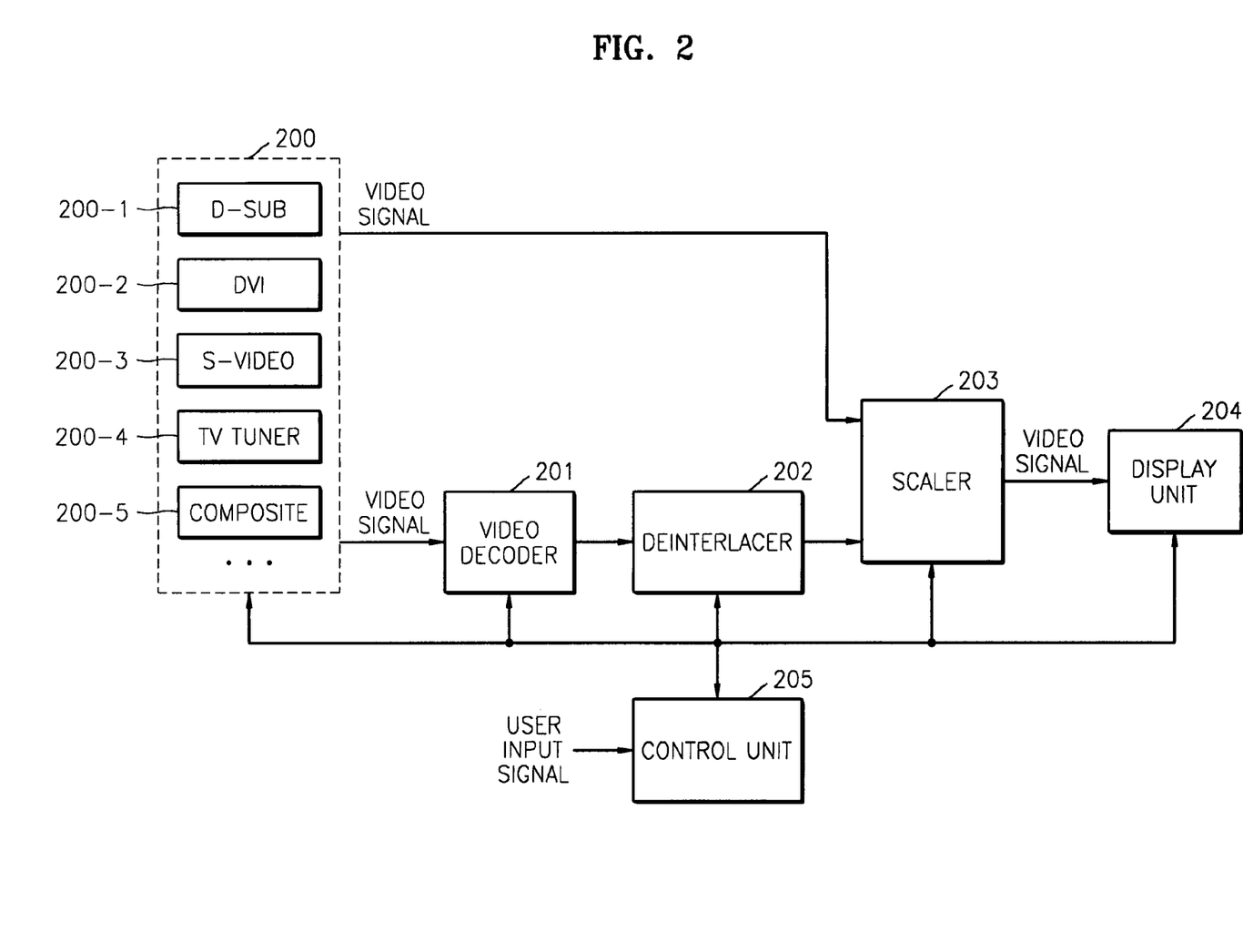
FIG. 2 is a block diagram of an apparatus displaying a double screen according to an embodiment of the invention.

FIG. 2 is a block diagram of an apparatus for displaying a double screen according to the present invention. The apparatus includes a video interface 200, a video decoder 201, a deinterlacer 202, a scaler 203, a display unit 204, and a control unit 205. In the present invention, the video interface 200 includes a D-SUB terminal 200-1, a digital video interactive (DVI) terminal 200-2, an S (separate)-VIDEO terminal 200-3, a television tuner terminal 200-4, and a COMPOSITE terminal 200-5.

Figure 3A:
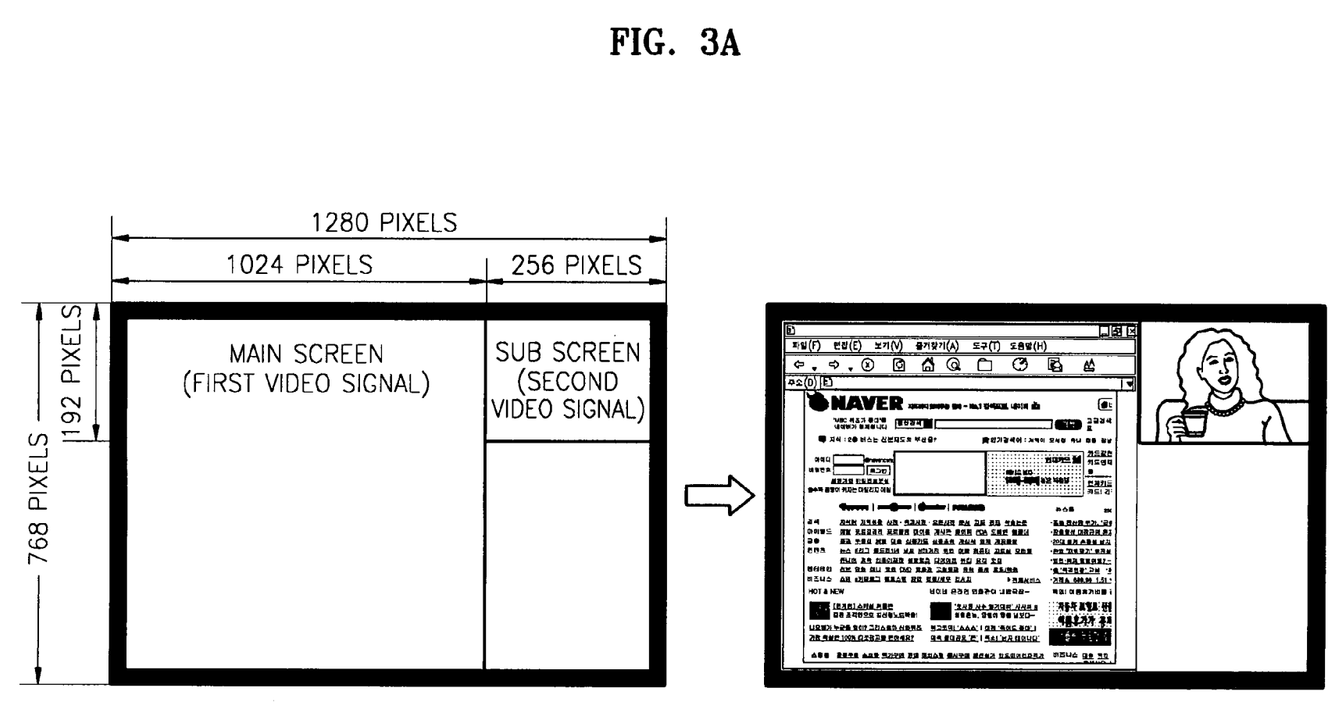
FIGS. 3A through 3C illustrate double screens displayed by the apparatus of FIG. 2.
Figure 3B:
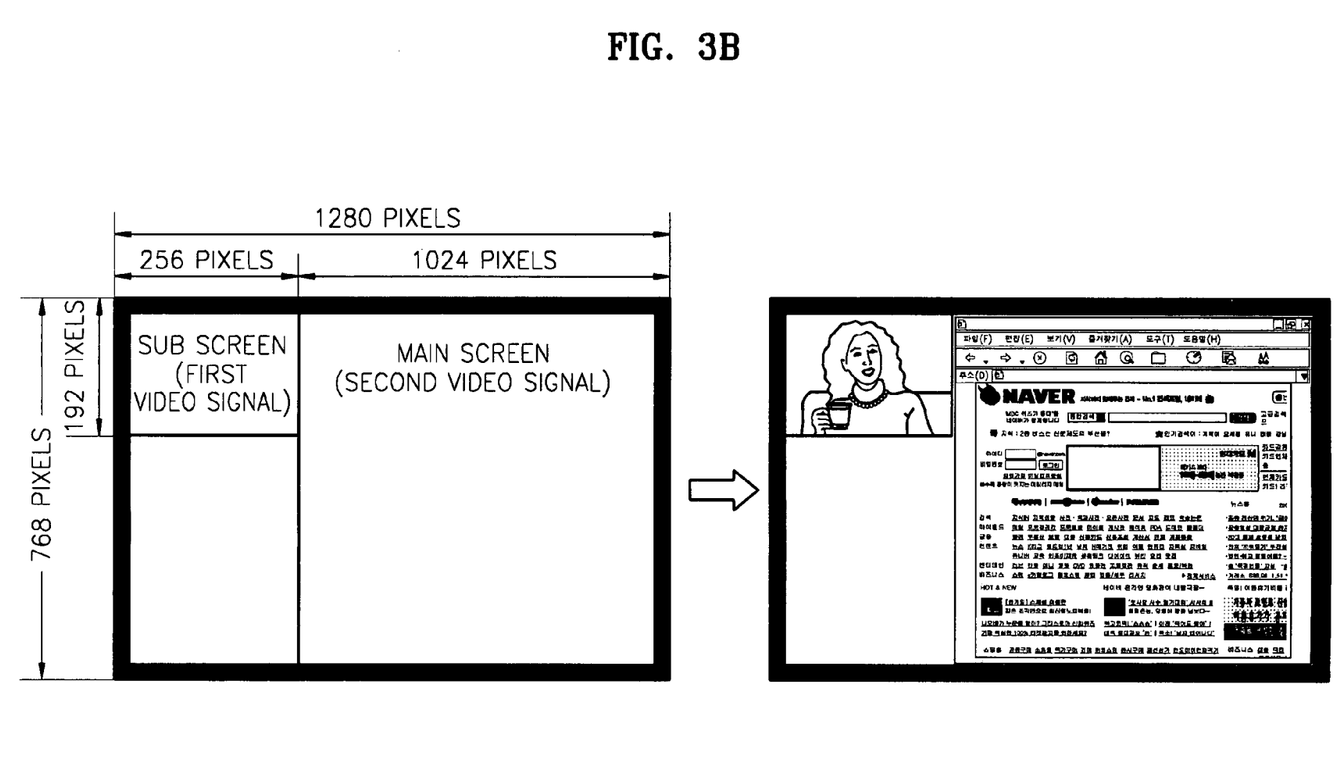
Figure 3C:
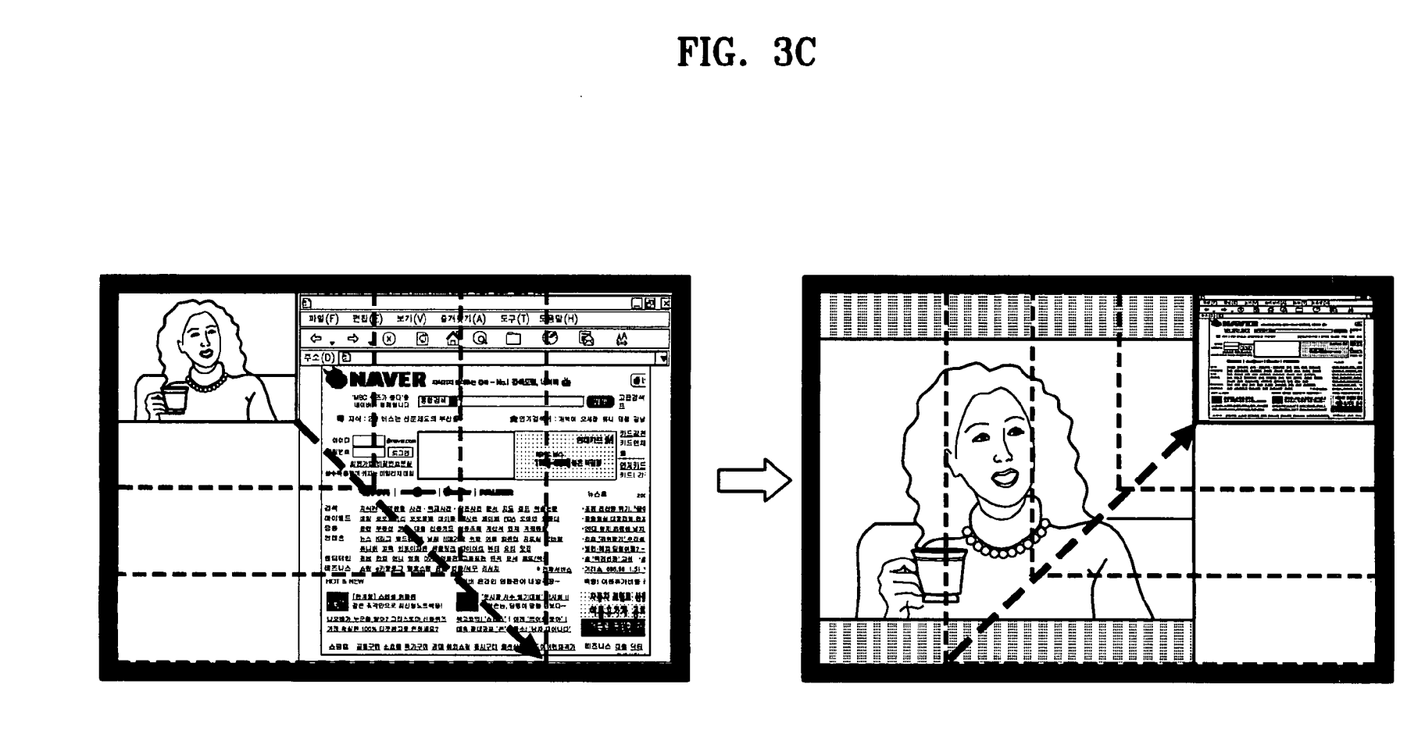

FIGS. 3A through 3C are views for explaining double screens displayed by the apparatus of FIG. 2 according to the present invention. In FIG. 3A, a main screen is displayed on the left side of the entire screen at a 4:3 aspect ratio and a subscreen is displayed on the remaining area of the entire screen at the 4:3 aspect ratio. In FIG. 3B, the main screen is displayed on the right side of the entire screen at the 4:3 aspect ratio and the subscreen is displayed on the remaining area of the entire screen at the 4:3 aspect ratio. In FIG. 3C, when a screen is converted, the main screen is converted into the subscreen by gradual reduction of the main screen and the subscreen is converted into the main screen by gradual enlargement of the subscreen. For example, the gradual reduction and gradual enlargement is performed at a constant 4:3 aspect ratio.

Figure 4:
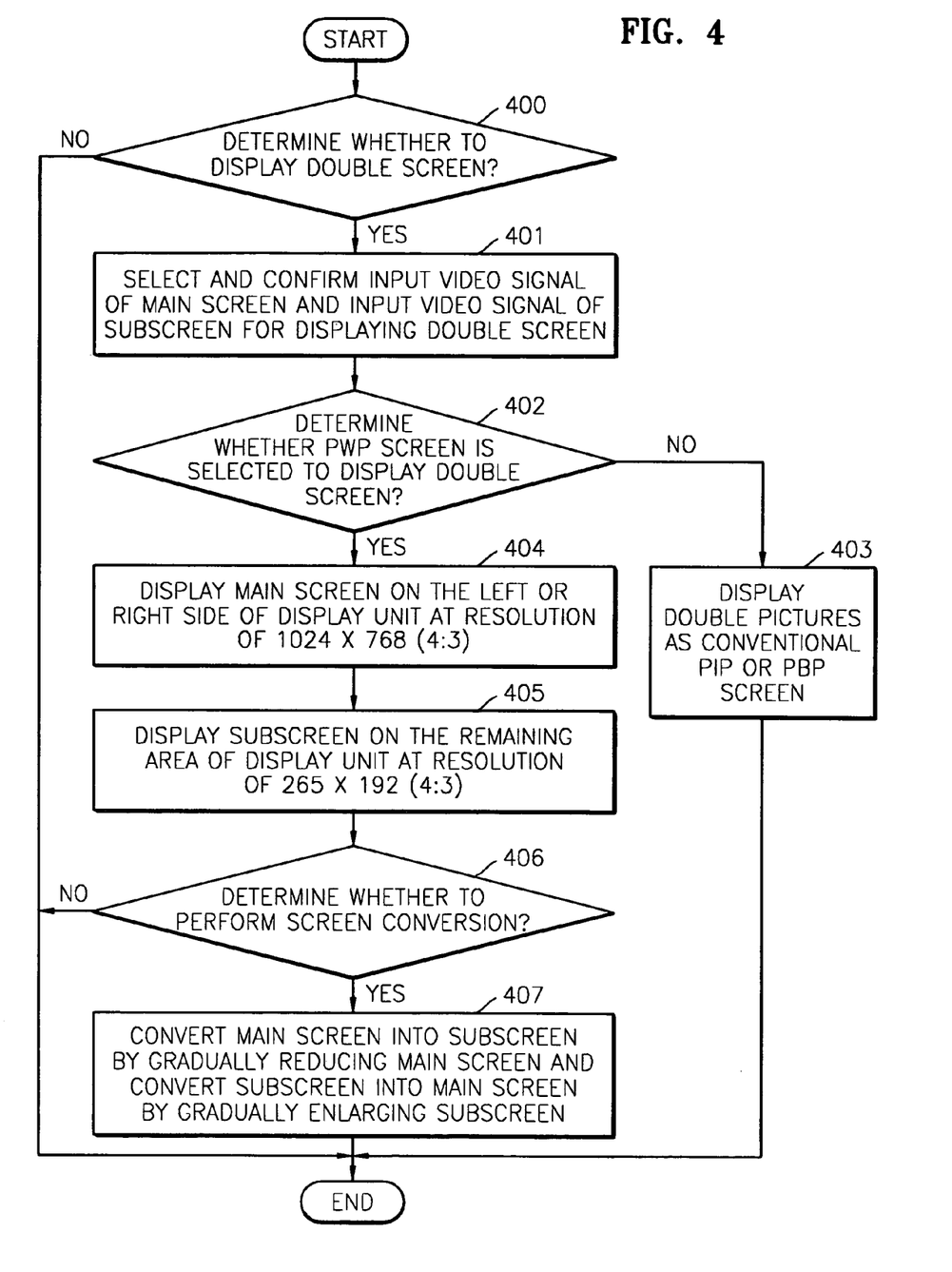
FIG. 4 is a flowchart illustrating a method of displaying a double screen according to the invention.

FIG. 4 illustrates a flowchart describing a method of displaying a double screen according to the present invention. The method includes determining whether to display a double screen (operation 400), selecting and confirming an input video signal of a main screen and an input video signal of a subscreen to be displayed as the double screen (operation 401), determining whether a picture with picture (PWP) screen is selected to display the double screen (operation 402), displaying the double screen as a conventional PIP or PBP screen (operation 403), displaying a main screen on the left or right side of a display unit at a resolution of 1024×768 (4:3) (operation 404), displaying a subscreen on the remaining area of the display unit at a resolution of 265×192 (4:3) (operation 405), determining whether to perform screen conversion (operation 406), and converting the main screen into the subscreen by gradually reducing the main screen and converting the subscreen into the main screen by gradually enlarging the subscreen (operation 407).

The subscreen is displayed on a portion of the remaining area of the screen that is not used to display the main screen, wherein the remaining area of the screen is equal to an entire displayable screen area minus a screen area used to display the main screen.

An apparatus for simultaneously displaying a double screen is described with reference to FIG. 2 and FIGS. 3A through 3C.

The video interface 200 receives a variety of video signals input from an external source. In the present invention, the video interface 200 receives video signals transmitted from any of three external devices (a PC, a game console, and a television). However, the number of external devices is not limited to three.

The video interface 200 receives video signals transmitted from a PC (not shown) through the D-SUB terminal 200-1 and the DVI terminal 200-2.

The video interface 200 receives a video signal transmitted from a game console (not shown) through the S-VIDEO terminal 200-3. Here, an S-VIDEO signal is formed by performing video transmission using two signals, i.e., a luminance signal Y and a chroma signal C, and the chroma signal C is formed by phase modulating two color difference signals of a composite signal. "S-VIDEO" is named in the sense that the luminance signal Y and the chroma signal C are separated from a composite signal. Use of S-VIDEO has begun with the development of high-definition video devices such as S-VHS, which is advantageous in that display quality superior to composite connection can be easily obtained.

Also, the video interface 200 receives video signals transmitted from a television (not shown) through the television tuner terminal 200-4 and the COMPOSITE terminal 200-5.

When the double screen is displayed, the video interface 200 outputs a first video signal and a second video signal under the control of the control unit 205. Here, the first video signal and the second video signal are output from one of the D-SUB terminal 200-1, the DVI terminal 200-2, the S-VIDEO terminal 200-3, the television tuner 200-4, and the COMPOSITE terminal 200-5. Here, it is assumed that the first video signal and the second video signal have a general screen aspect ratio of 4:3.

Among the video signals input to the video interface 200, the video signal transmitted from the PC (not shown) through either the D-SUB terminal 200-1 or the DVI terminal 200-2 is directly output to the scaler 203.

However, among the video signals input to the video interface 200, the video signal transmitted from the game console (not shown) through either the S-VIDEO terminal 200-3 or the video signal transmitted from the television (not shown) through either the television tuner terminal 200-4 or the COMPOSITE terminal 200-5 is output to the video decoder 201.

The video decoder 201 decodes the video signal output from the video interface 200 through one of the S-VIDEO terminal 200-3, the television tuner terminal 200-4, and the COMPOSITE terminal 200-5 and outputs the decoded video signal to the deinterlacer 202.

The deinterlacer 202 deinterlaces the decoded video signal and outputs the resulting signal to the scaler 203.

The scaler 203 scales the received video signal to a resolution suitable for a specification of the display unit 204. In addition, the scaler 203 adjusts precise control functions of many factors that determine images as well as the resolution and outputs the processed video signal to the display unit 204. Here, the display unit 204 has a wide screen aspect ratio of 16:9, and the scaler 203 scales the received video signal to a resolution of 1280×768, which is suitable for the wide screen aspect ratio of 16:9, and outputs the scaled signal.

However, if a user selects a double screen display signal, the scaler 203 performs scaling for displaying a double screen under the control of the control unit 205.

The control unit 205 receives the double screen display signal input through a keypad (not shown) or remote control (not shown). The control unit 205 then outputs an on screen display (OSD) menu to the display unit 204. Here, the OSD menu includes a PIP screen, a PBP screen, and a PWP screen that are to be selected by the user for displaying a double screen. In addition, the control unit 205 receives a first video selection signal and a second video selection signal.

The first video signal of the main screen may be output from one of the D-SUB terminal 200-1, the DVI terminal 200-2, the S-VIDEO terminal 200-3, the television tuner 200-4, and the COMPOSITE terminal 200-5 output from the video interface 200.

Similarly, the second video signal of the subscreen is output from one of the D-SUB terminal 200-1, the DVI terminal 200-2, the S-VIDEO terminal 200-3, the television tuner 200-4, and the COMPOSITE terminal 200-5 output from the video interface 200.

If the user selects one of the PIP screen and PBP screen from the OSD menu output by the control unit 205, the control unit 205 issues a scaling command to the scaler 203 so as to output a screen shown in FIG. 1A or 1B.

If the user selects the PWP screen from the OSD menu output by the control unit 205, the control unit 205 issues a PWP scaling command to the scaler 203 so as to output a screen shown in FIG. 3A or 3B.

When receiving the PWP scaling command from the control unit 205, the scaler 203 scales the first video signal of the main screen to the resolution of 1024×768 (4:3) and scales the second video signal of the subscreen to the resolution of 256×192 (4:3).

The control unit 205 displays the scaled first video signal and second video signal on certain areas of the display unit 204, respectively. FIGS. 3A and 3B show displayed double screens, i.e., the main screen and the subscreen, on the entire screen, that are controlled by the control unit 205. Here, the main screen is a signal input from the PC and the subscreen is a signal input from the television.

In FIG. 3A, the main screen is displayed on the left side of the entire screen at a 4:3 aspect ratio and the subscreen is displayed on the remaining area of the entire screen at the 4:3 aspect ratio. The entire screen of a wide screen display device has a resolution of 1280×768 (16:9). The main screen is displayed on the left side of the entire screen at a resolution of 1024×768 (4:3) and the subscreen is displayed on the remaining area of the entire screen at a resolution of 256×192 (4:3).

In FIG. 3B, the main screen is displayed on the right side of the entire screen at the 4:3 aspect ratio, and the subscreen is displayed on the remaining area of the entire screen at the 4:3 aspect ratio. The entire screen of the wide screen display device has the resolution of 1280×768 (16:9). The main screen is displayed on the right side of the entire screen at the resolution of 1024×768 (4:3), and the subscreen is displayed on the remaining area of the entire screen at the resolution of 256×192 (4:3).

The control unit 205 receives a screen conversion signal from the user. Screen conversion refers to converting a presently displayed main screen into a subscreen and the subscreen into the main screen. Once receiving the screen conversion signal, the control unit 205 issues a scaling command for screen conversion to the scaler 203. In FIG. 3C, in screen conversion through scaling of the scaler 203, the main screen is converted into the subscreen by gradually reducing the main screen and the subscreen is converted into the main screen by gradually enlarging the subscreen.

The scaler 203 converts the main screen with the resolution of 1024×768 (4:3) into the subscreen with the resolution of 256×192 (4:3) by gradually reducing the main screen. Gradual reduction is also carried out at a 4:3 ratio. At this time, a process of converting the main screen into the subscreen is displayed on the display unit 204 by the control unit 205.

The scaler 203 converts the subscreen with the resolution of 256×192 (4:3) into the main screen with the resolution of 1024×768 (4:3) by gradually enlarging the subscreen. Gradual enlargement is also carried out at a 4:3 ratio. At this time, a process of converting the subscreen into the main screen is displayed on the display unit 204 by the control unit 205.

A method of displaying a double screen is described below with reference to FIGS. 3A through 3C and FIG. 4.

The control unit 205 displays the double screen according to whether the double screen display signal is received from the user (operation 400). The user determines whether to display the double screen.

The control unit 205 receives the double screen display signal input through a keypad (not shown) or a remote control (not shown). The control unit 205 then outputs the OSD menu to the display unit 204. Here, the OSD menu includes the PIP screen, the PBP screen, and the PWP screen that are to be selected by the user.

The control unit 205 receives an input video signal of the main screen and an input video signal of the subscreen to simultaneously display the double screen (operation 401).

Here, it is assumed that the first video signal and the second video signal have general screen aspect ratios of 4:3. The first video signal of the main screen may be output from one of the D-SUB terminal 200-1, the DVI terminal 200-2, the S-VIDEO terminal 200-3, the television tuner 200-4, and the COMPOSITE terminal 200-5 output from the video interface 200. Similarly, the second video signal of the subscreen may be output from one of the D-SUB terminal 200-1, the DVI terminal 200-2, the S-VIDEO terminal 200-3, the television tuner 200-4, and the COMPOSITE terminal 200-5 output from the video interface 200.

In operation 402, it is determined whether a user selects the PWP screen from the OSD menu to display the double screen.

If the user selects the PIP screen or PBP screen from the OSD menu output by the control unit 205 to display the double screen, the double screen is displayed as a conventional PIP or PBP screen (operation 403). If the user selects the PIP screen or PBP screen from the OSD menu output by the control unit 205, the control unit 205 issues the PIP or PBP scaling command to the scaler 203 to display the screen shown in FIG. 1A or 1B. The scaler 203 performs scaling suitable for the PIP screen or PBP screen and then outputs the scaled video signal to the display unit 204 under the control of the control unit 205.

If the user selects the PWP screen from the OSD menu output by the control unit 205 to display the double screen, the main screen is displayed on the left or right side of the display unit 204 at the resolution of 1024×768 (4:3) (operation 404) and the subscreen is displayed on the remaining area of the display unit 204 at the resolution of 256×192 (4:3) (operation 405).

If the user selects the PWP screen from the OSD menu output by the control unit 205, the scaler 203 issues the PWP scaling command to the scaler 203 to display a screen shown in FIG. 3A or 3B. Upon receiving the PWP scaling command from the control unit 205, the scaler 203 scales the first video signal of the main screen to the resolution of 1024×768 (4:3) and scales the second video signal of the subscreen to the resolution of 256×192 (4:3).

The control unit 205 displays the scaled first video signal and second video signal on certain areas of the display unit 204, respectively. FIGS. 3A and 3B show displayed double screens, i.e., the main screen and the subscreen, on the entire screen under the control of the control unit 205.

In FIG. 3A, the main screen is displayed on the left side of the screen at the resolution of 1024×768 and the subscreen is displayed on a portion of a remaining area of the screen at the resolution of 256×192. In FIG. 3B, the main screen is displayed on the right side of the screen at the resolution of 1024×768 and the subscreen is displayed on a portion of a remaining area of the screen at the resolution of 256×192.

The control unit 205 determines whether the main screen and the subscreen of a presently displayed double screen are converted according to whether the screen conversion signal is received from the user (operation 406).

Then, the control unit 205 converts the main screen into the subscreen by gradually reducing the main screen and converting the subscreen into the main screen by gradually enlarging the subscreen (operation 407).

The control unit 205, receiving the screen conversion signal, issues the scaling command for screen conversion to the scaler 203. In FIG. 3C, in screen conversion, the main screen is converted into the subscreen by gradually reducing the main screen and the subscreen is converted into the main screen by gradually enlarging the subscreen.

The scaler 203 converts the main screen with the resolution of 1024×768 (4:3) into the subscreen with the resolution of 256×192 (4:3) by gradually reducing the main screen. Gradual reduction is also carried out at a 4:3 ratio. At this time, a process of converting the main screen into the subscreen is displayed on the display unit 204 by the control unit 205. The scaler 203 converts the subscreen with the resolution of 256×192 (4:3) into the main screen with the resolution of 1024×768 (4:3) by gradually enlarging the subscreen. Gradual enlargement is also carried out at a 4:3 ratio. At this time, a process of converting the subscreen into the main screen is displayed on the display unit 204 by the control unit 205.

As described above, according to the invention, it is possible to provide undistorted screen information to a user by simultaneously displaying a main screen and a subscreen while maintaining a 4:3 aspect ratio of input video signals.

In addition, since the main screen is converted into the subscreen by gradually reducing the main screen and the subscreen is converted into the main screen by gradually enlarging the subscreen, it is possible to minimize loss of information in screen conversion.

While the present invention has been particularly shown and described with reference to an exemplary embodiment thereof, it will be understood by those of ordinary skill in the art that various changes in form and details may be made therein without departing from the spirit and scope of the invention as defined by the appended claims and their equivalents.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for displaying a double screen in a wide screen display device, the apparatus comprising:
   a video interface to receive first and second video signals from a plurality of video signals input from outside the display device according to a selection control signal, wherein each of the first and the second video signals has a general screen aspect ratio;

a scaler to scale the first video signal to a resolution of a main screen with the general screen aspect ratio and to scale the second video signal to a resolution of a subscreen with the general screen aspect ratio, according to a scaling control signal; and a control unit to output the selection control signal to display the double screen, control scaling of the first and second video signals according to a main screen selection signal of the first video signal and a subscreen selection signal of the second video signal, and to simultaneously display the scaled first video signal on a screen and the scaled second video signal on a portion of a remaining area of the screen, wherein the control unit converts the main screen into the subscreen and the subscreen into the main screen according to a screen conversion signal, and when the main screen is converted into the subscreen, the control unit outputs the scaling control signal to gradually reduce the main screen while maintaining the general screen aspect ratio of the main screen, and when the subscreen is converted into the main screen, the control unit outputs the scaling control signal to gradually enlarge the sub screen while maintaining the general screen aspect ratio of the subscreen.

2. The apparatus of claim 1, wherein the scaler scales the first video signal to a 1024×768 resolution and scales the second video signal to a 256×192 resolution, wherein the screen has a 1280×768 resolution.

3. The apparatus of claim 1, wherein the control unit operates to display each of the first and second video signals at original aspect ratios without distortion.

4. The apparatus of claim 1, wherein a gradual screen conversion process is displayed on the display device.

5. A method of displaying a double screen, the method comprising:

receiving a first video signal and a second video signal among various video signals input from outside the display device according to a selection control signal, the first video signal and the second video signal having general screen aspect ratios;

scaling the first video signal to a resolution of a main screen with the general screen aspect ratio and scaling the second video signal to a resolution of a subscreen with the general screen aspect ratio, according to a scaling control signal;

displaying the scaled first video signal on a screen and the scaled second video signal on a portion of a remaining area of the screen; and converting the main screen of the first video signal into the subscreen of the second video signal and the subscreen of the second video signal into the main screen of the first video signal, wherein the converting the main screen into the subscreen comprises outputting the scaling control signal to gradually reduce the main screen while maintaining the general screen aspect ratio of the main screen, and the converting the subscreen into the main screen comprises outputting the scaling control signal to gradually enlarge the subscreen while maintaining the general screen aspect ratio of the subscreen.

6. The method of claim 5, further comprising scaling the first video signal to a 1024×768 resolution and scaling the second video signal to a 256×192 resolution.

7. An apparatus for displaying a double screen in a display device capable of displaying the double screen, the apparatus comprising:

a video-interface receiving first and second video signals from among a plurality of video signals according to a selection control signal;

a scaler scaling the first and second video signals to a resolution of a main screen and a resolution of a subscreen, respectively, according to a scaling control signal;

a control unit controlling the scaling of the first and second video signals and simultaneously displaying each scaled video display on a respective area of a screen of the display device; and an on screen display menu on the display unit for a user to select to display the double screen, wherein the on screen display menu includes a picture-in-picture screen, a picture-by-picture screen, and a picture-with-picture screen.

8. The apparatus of claim 7, wherein the control unit outputs the selection control signal to display the double screen.

9. The apparatus of claim 8, wherein the control unit simultaneously displays the first video signal on the screen and the second video signal on a portion of a remaining area of the screen.

10. The apparatus of claim 7, wherein the video interface comprises a D-SUB terminal, a digital video interactive terminal, an S-VIDEO terminal, a television tuner terminal, and a COMPOSITE terminal.

11. The apparatus of claim 10, wherein the D-SUB terminal and/or the DVI terminal transmit video signals directly to the scaler.

12. The apparatus of claim 11, further comprising a video decoder to decode video signal output from the video interface through one of the S-VIDEO terminal, the television tuner terminal, and the COMPOSITE terminal.

13. The apparatus of claim 12, further comprising a deinterlacer to deinterlace the decoded video signal and output a resulting signal to the scaler.

14. The apparatus of claim 13, wherein the scaler adjusts the resolution and outputs a processed video signal of the adjusted first and second video signals to the display device.

15. The apparatus of claim 7, wherein the first and the second video signals have a 4:3 aspect ratio and the screen has a 16:9 aspect ratio.

16. The apparatus of claim 7, wherein the scaler scales the first video signal to a 1024×768 resolution and scales the second video signal to a 256×192 resolution, wherein the screen has a 1280×768 resolution.

17. The apparatus of claim 7, wherein the control unit converts the main screen into the subscreen and the subscreen into the main screen.

18. The apparatus of claim 17, wherein when the main screen is converted into the subscreen, the control unit outputs the scaling control signal to gradually reduce the main screen while maintaining the aspect ratio of the main screen, and when the subscreen is converted into the main screen, the control unit outputs the scaling control signal to gradually enlarge the sub screen while maintaining the aspect ratio of the subscreen.

19. A method of displaying a double screen in a display device capable of displaying the double screen, the method comprising:

receiving first and second video signals from among a plurality of video signals according to a selection control signal;

scaling the first and second video signals to a resolution of a main screen and a resolution of a subscreen, respectively, according to a scaling control signal;

displaying the scaled first and second video signals simultaneously such that the subscreen is located in a separate area from the main screen on a screen of the display device; and displaying an on screen display menu to select from among a plurality of displays to display the double screen, wherein the displays to display the double screen comprise a picture-in-picture screen, a picture-by-picture screen, and a picture-with-picture screen.

20. The method of claim 19, wherein the receiving first and second video signals comprises receiving first and second video signals from one of a D-SUB terminal, DVI terminal, S-VIDEO terminal, television tuner, and COMPOSITE terminal output.

21. The method of claim 19, further comprising selecting one of the picture-in-picture screen or picture-by-picture screen and scaling and displaying the selected picture-in-picture screen or picture-by-picture screen on the display device.

22. The method of claim 19, further comprising selecting the picture-with-picture screen and scaling and displaying the selected picture-with-picture screen on the display device.

23. The method of claim 22, further comprising scaling each of the first and second video signals of the picture-with-picture screen to an aspect ratio of 4:3, wherein the screen has an aspect ratio of 16:9.

24. The method of claim 23, further comprising scaling the first video signal of the main screen to a 1024×768 resolution and scaling the second video signal of the subscreen to a 256×192 resolution.

25. The method of claim 24, further comprising displaying the main screen at either a left or a right edge of the screen and displaying the subscreen on a portion of a remaining area of the screen.

26. The method of claim 19, further comprising converting the main screen into the subscreen and the subscreen into the main screen; wherein the main screen is converted into the subscreen by gradually reducing the main screen at a constant aspect ratio and the subscreen is converted into the main screen by gradually enlarging the subscreen at the constant aspect ratio.

27. The method of claim 26, further comprising performing the gradual reduction and the gradual enlargement process at the constant aspect ratio of 4:3.

28. A method of displaying a double screen in a display device capable of displaying the double screen, the method comprising:

displaying a double screen according to a first user selection;

using a first input video signal to display a main screen and a second input video signal to display a subscreen;

displaying the main screen on the left or the right edge of a screen and displaying the subscreen on a portion of a remaining area of the screen remaining when a picture-with-picture display is selected;

performing a screen conversion for the picture-with-picture display according to a second user selection, wherein the main screen is converted into the subscreen by gradually reducing the main screen at a constant aspect ratio and the subscreen is converted into the main screen by gradually enlarging the subscreen at the constant aspect ratio; and selecting from among various displays on an on screen display menu to display the double screen, wherein the various displays comprise a picture-in-picture display, a picture-by-picture display, and the picture-with-picture display.

29. The method of claim 28, further comprising scaling and displaying the main screen at a 4:3 aspect ratio having a resolution of 1024×768 and scaling and displaying the subscreen at the 4:3 aspect ratio having the resolution of 256×192.

30. The method of claim 29, further comprising providing undistorted screen information to the user and minimizing a loss of information in screen conversion by simultaneously displaying the main screen and the subscreen while maintaining a constant aspect ratio of the main screen and the subscreen.

31. The method of claim 28, further comprising outputting each of the main screen and subscreen video signal from one of a D-SUB terminal, DVI terminal, S-VIDEO terminal, television tuner, and COMPOSITE terminal output.

* * * * *